United States Patent [19]
Nugent

[11] Patent Number: 5,248,124
[45] Date of Patent: Sep. 28, 1993

[54] REMOTE WATER SHUT-OFF MODULE FOR USE BY DISABLED AND INFIRM

[76] Inventor: George Nugent, 65A Village Cir. W., Manorville, N.Y. 11949

[21] Appl. No.: 804,023

[22] Filed: Dec. 9, 1991

[51] Int. Cl.$^5$ ............................................. F16K 31/04
[52] U.S. Cl. ........................... 251/129.11; 251/129.14; 251/77; 251/129.2; 251/147
[58] Field of Search ..................... 251/129.11, 129.14, 251/77, 129.2, 147

[56] References Cited

U.S. PATENT DOCUMENTS

| Re. 17,689 | 6/1930 | Hibbard . |
| Re. 31,204 | 4/1983 | Sanner . |
| 386,242 | 7/1888 | Frye . |
| 1,585,816 | 5/1926 | Atherton . |
| 2,038,289 | 4/1936 | Herbster . |
| 4,286,626 | 9/1981 | Leiben . |
| 4,538,645 | 9/1985 | Perach . |
| 4,790,514 | 12/1988 | Marks ...................... 251/129.11 X |
| 5,011,112 | 4/1991 | Glamm ........................... 251/129.11 |
| 5,052,656 | 10/1991 | Katayama ..................... 251/129.11 |

*Primary Examiner*—Arnold Rosenthal
*Attorney, Agent, or Firm*—Alfred M. Walker

[57] ABSTRACT

A single-unit, remote shut-off module for use by the disabled and infirm has a single-unit module attached by clamps to external water source and outflow connector pipes and housing a shaft which itself houses a plunger with a rubber ball seal which is guided through a shaft guide by electrical current from an electrical motor unit, which is fitably attached above the external water source connector pipe to direct the plunger into the seal of the mouth of the outflow connector pipe, and thereby to interrupt the communication of water from the external water source connector pipe through the module into the outflow connector pipe during a plumbing emergency at the discretion of the user.

1 Claim, 2 Drawing Sheets

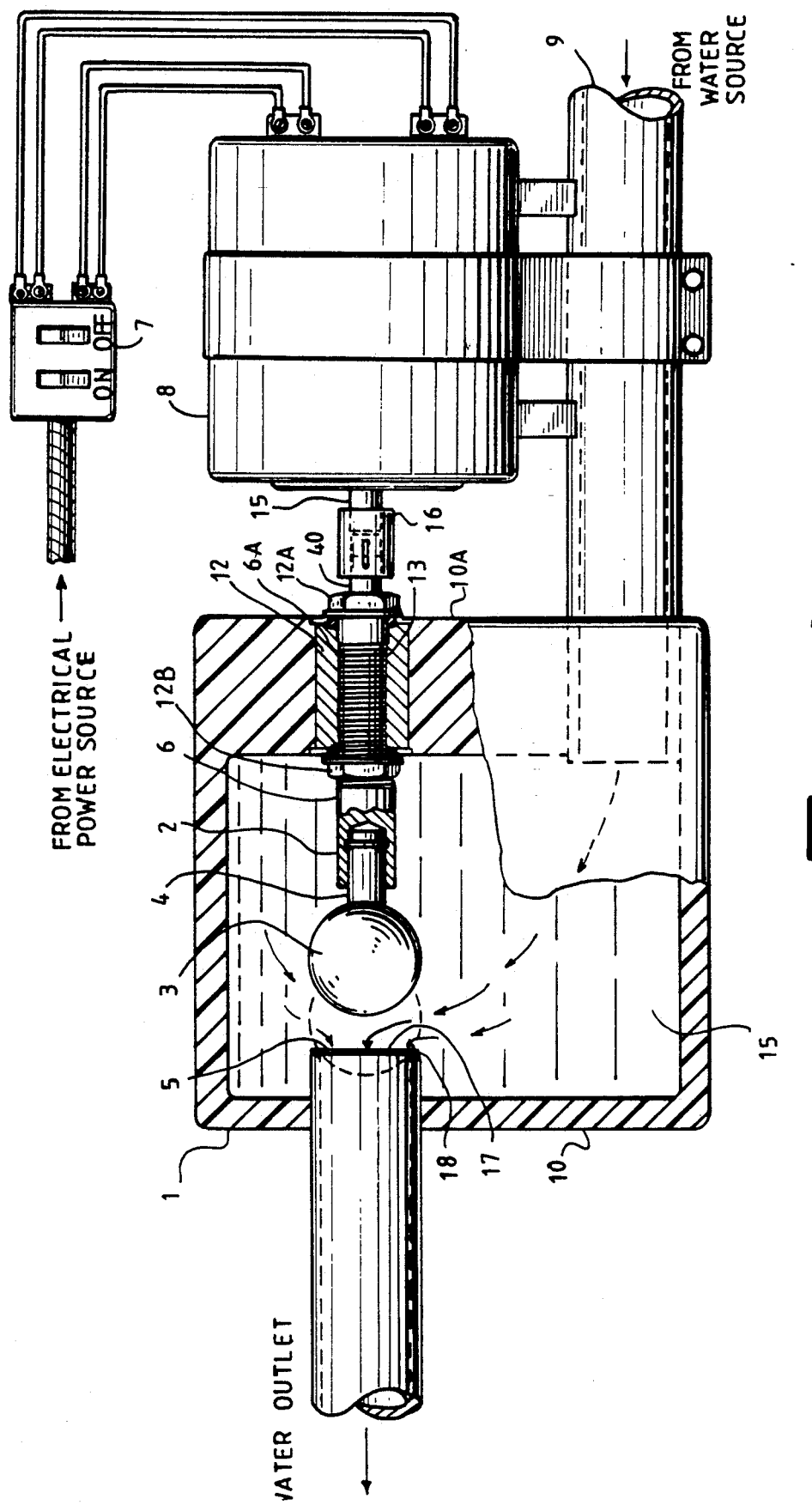

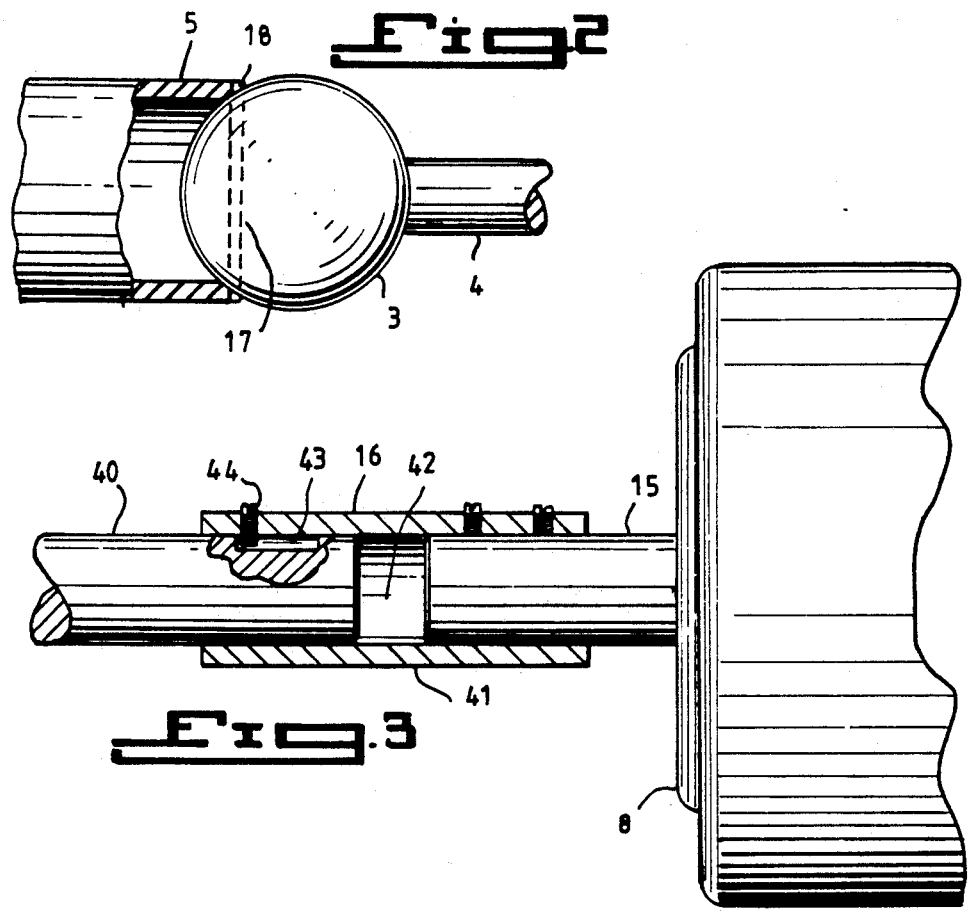
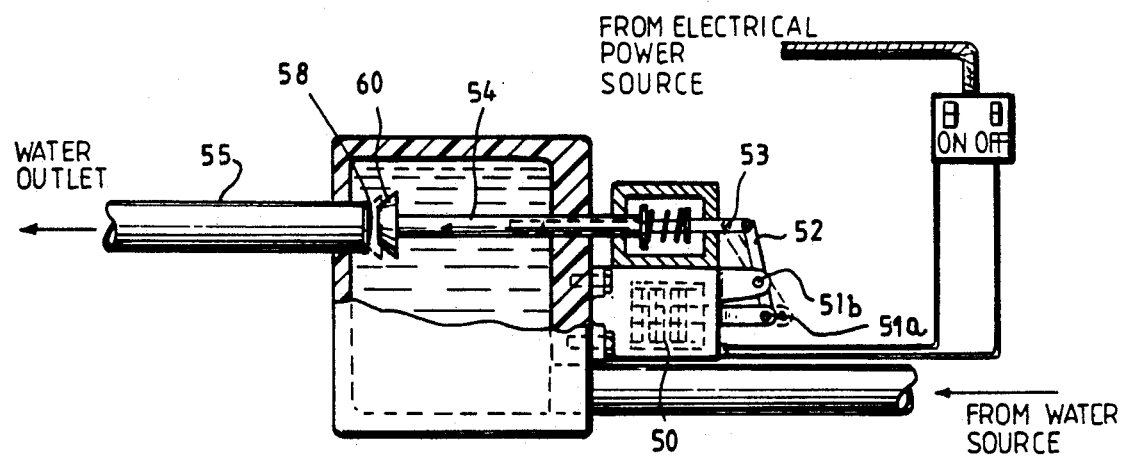
Fig.4
(ALTERNATIVE-SOLENOID/POPPET VALVE)

5,248,124

REMOTE WATER SHUT-OFF MODULE FOR USE BY DISABLED AND INFIRM

BACKGROUND OF THE INVENTION

The present invention relates to a remote water shut-off module for use by the disabled and infirm and more particularly to a remote water shut-off system utilizing a shaft guide and ball plunger which engage upon the ignition of electrical current at the decision of the user.

While inventions which include remote control and/or electrically operated valve apparatus exist (see Atherton, U.S. Pat. No. 1,585,816 and Hibbard, U.S. Patent reissue number Re 17,689), none of the current art provides for the expeditious, remote shut-off of the flow of water in a plumbing emergency by the use of an electrically operated plunger which is fitably engaged inside of a shaft and connected to a ball to cease the flow of water before it enters into the system of plumbing pipes and connectors.

SUMMARY OF THE INVENTION

Accordingly, it is an object of the present invention to provide a remote shut-off module for the use of the disabled and infirm utilizing a shaft guide and ball plunger which engage upon the ignition of electric current at the decision of the user, which eliminates the necessity of physical exertion on the part of the user.

In keeping with these objects and with others which will become apparent hereinafter, one feature of the present invention resides, briefly stated, in an electric motor and electric switch housed in a single unit fitably attached above a connector pipe which extends into a domicile from an external water source. When in normal use, water flows into the connector pipe from the external water source and runs into the module, which is fitted between the external water source connector pipe and the outflow connector pipe. Water flows through the module into an opening between the module and the copper or plastic outflow pipe into a domicile's plumbing system. The present invention provides a one-piece housing element for the module with shaft and shaft guide to electrically push a ball plunger into the mouth of the outlet connector pipe to stop the flow of water from the external water source into a domicile's plumbing system. The ball plunger remains in its place until the cessation of the plumbing emergency which necessitated its use. The ball plunger returns to its original position in the shaft unit upon being signaled to do so by the electric switch, which is operated remotely by the user.

When the module is designed in accordance with the present invention, it has considerably less parts and therefore is easier to assemble in tight places. Additional joints which are susceptible to leaks are eliminated, and the module does not break under the action of high forces applied for tightening. The module is unique in that it provides a single assembly to be fitably attached to the external water source connector pipe and the outflow connector pipe.

In accordance with another advantageous feature of the present invention, the ball plunger operated by the electric switching mechanism has a surface which, upon piercing the existing outflow connector pipe, can be brought in tight contact with a seal and water tightly interrupt the communication between the existing pipe and the water in the module unit which has been communicated into it by the external water source connector pipe. The thusly designed module permits not only the "normal" operation of the flow of water into a domicile's plumbing system, but also the closing of the existing outflow connector pipe in the case of a plumbing emergency.

The novel features of the present invention are set forth in particular in the appended claims. The invention itself will be best understood from the following description of a preferred embodiment, which is accompanied by the following drawing.

BRIEF DESCRIPTION OF THE DRAWING

FIG. 1 is a side view in partial section of the invention showing its operation when connected to an external water source connector pipe and an outflow connector pipe.

FIG. 2 is a close up side view i partial section of the ball sealing portion of the invention.

FIG. 3 is a close side view in partial section of the plunging portion of the invention.

FIG. 4 is a side view in partial section of an alternate embodiment of the invention.

DESCRIPTION OF A PREFERRED EMBODIMENT

A single-unit module 1 has an integral one-piece housing element 10 which simultaneously forms a housing for an elongated plunger 2 with a rubber ball seal 3, fitably mounted to shaft 4 and directed into the mouth of outflow connector pipe 5 by shaft assembly 6, which shaft 4 is controlled by electric switch 7 connected to electrical motor unit 8. The motor unit 8 is attached to the external water source connector pipe 9.

The single-unit module 1 is attached to external water source connector pipe 9 and outflow connector pipe 5 by the use of conventional fastening numbers, not shown. Plunger 2 with rubber ball seal 3 is housed in a shaft assembly 6 built into the module and extending into its inner chamber 15, directly above external water source connector pipe 9. Shaft assembly is sealed to prevent leakage of the water from the single-unit module 1. Shaft assembly includes shaft guide 16 to slidably direct plunger 2 and rubber ball seal 3 into reciprocal circumferential seal 18 of the rounded edged mouth orifice 17 of outflow connector pipe 5 to discontinue the communication of water from the external water source connector pipe 9 through single-unit module 1 into outflow connector pipe 5. The end of shaft 4, which is opposite to the end secured to ball seal 3 is secured longitudinally within shaft guide 6, which is longitudinally secured to shaft guide sub assembly 6A which subassembly 6A is mounted within a wall 10A of housing element 10. The generation of electrical current by ignition of remotely controlled switch 7 dictates the movement of plunger 2 and rubber ball 3 into and out of out seal 18 of outflow connector pipe 5.

Rotatable shaft guide subassembly 6A is threadably movable within inlaid tubing 12 having internal reciprocal threading surface 13, within which shaft guide subassembly 6A advances shaft assembly 6 and shaft 4, thereby guiding and propelling the movement of plunger seal 3 in a rotatable manner longitudinally toward outflow connector pipe 5. At the portion of shaft guide subassembly 6A closest to outflow connector pipe 5 there is located shaft guide 6, also extending longitudinally toward water outflow connector pipe 5. Conventional fasteners such as nuts 12A and 12B, secure inlaid tubing 12 within wall 10A of housing element 10.

Shaft 4 has attached, at its end closest to seal 18 of outflow connector pipe 5, the rubber ball seal 3. (It is noted that other similar resilient materials such as plastics may be employed spherically in a manner similar to rubber ball seal 5.) At the end of shaft 4 transverse from the rubber ball seal 3, shaft 4 is fixably mounted within shaft guide 6 such that both shaft 4 and shaft guide 6 extend longitudinally within housing unit 10 in a direction with a common axis.

As shaft subassembly 6A advances rotatably within the threaded interior wall surface 13 of inlaid tubing 12 mounted within the wall 10A of housing element 10, mechanical power is transmitted from the electric motor to rotatable shaft guide subassembly 6A by means of drive shaft 15 of electric motor unit 8.

However, to prevent fracturing of any of the components and seals of the device, a shock absorbing assembly 16 attaches shaft extension member 40 to shaft subassembly 6A of electric motor 8.

As shown in FIG. 3, shock absorbing assembly 16 includes a generally cylindrical bracket member 41 having a gap 42 between drive shaft 15 and shaft extension member 40. The gap 42 permits shaft extension member 40 to slide through gap 42 of cylindrical bracket member 41 when excess or sudden force from reverse water pressure out of outflow connector pipe 5 impresses inward upon rubber ball seal 3, and thereby upon shaft 4, shaft assembly 6, shaft subassembly 6A and ultimately against shaft extension member 40. Furthermore, whenever the ball seal 3 engages the outflow connector pipe 5, the ball seal 3 requires some resiliency to accommodate the surge of water pressure against the ball seal 3.

Therefore, a small horizontal, longitudinal movement is permitted during sudden changes of water pressure. This movement of shaft extension member 40 within cylindrical bracket member 41 is limited by the length of longitudinally extending track guide groove 43, which track guide 43 limits the movement of shaft extension member 40 by means of blocking member 44, such as a set screw.

Consequently, the device has a built in safety device to permit some initial give under water pressure conditions of sudden change.

An alternate poppet-type embodiment for the device in FIG. 4, wherein a solenoid 50 controls cooperating lever arms 51a, 51b and 52, causing reciprocal lever arm 53 to move in a direction opposite to that of lever arms 51a and 51b, thereby causing shaft member 54 to extend longitudinally within housing element 10A.

As an alternate to rubber ball seal 3, there may be provided funnel shaped seal 60, which engages in sealing manner with the rounded sealed edge of water outlet connector pipe 55.

The assembly shown in FIG. 1 is installed on the existing pipe, outflow connector pipe 5 and external water source connector pipe 9. This assembly includes a minimal number of working parts and therefore can be easily installed even in very tight places. When used in conjunction with electrical motor unit 8, the present invention provides a safe, reliable, expeditious and nonexertionary means to interrupt the communication of water from an external water source into a domicile's plumbing system. It is to be noted that various modifications may be made without departing from the principles and scope of the appended claims.

I claim:

1. A remote water shut-off apparatus for the use of the disabled and infirm, which interrupts the communication of water from a pressurized water source, which comprises:

a housing having an inlet side, an outlet side, front, back, bottom and top forming a fluid tight chamber therebetween;

an inlet pipe in fluid communication with a pressurized water source and the fluid tight chamber, the inlet pipe secured to the inlet side of the housing;

an outlet pipe in fluid communication with the fluid tight chamber, the outlet pipe secured to the outlet side of the housing in offset alignment with the inlet pipe;

a selectively actuated motor secured to the housing having a rotatable shaft extending from the motor, through a threaded aperture in the inlet side of the housing, the rotatable shaft positioned in linear alignment with the offset outlet pipe, and a sealing means secured to the free end of the rotatable shaft; whereby the motor is selectively remotely actuated to rotatably advance the sealing means to abut the end of the outlet pipe to seal the end of the outlet pipe to stop water from flowing from the housing chamber, and the motor is selectively remotely actuated to rotatably retract the rotatable shaft to withdraw the sealing means from the end of the outlet pipe to allow pressurized fluid from the inlet pipe to pass through the housing into the outlet pipe;

a first shaft end portion disposed to said sealing means, a rotatable seal guiding portion, said seal guiding portion disposed to a rotatable first subassembly threadably engagable with a reciprocal threaded tube supported in a wall of said fluid tight chamber, said first sub-assembly further having a second shaft extension member at an end opposite to an end engageable with said first shaft end portion, said second shaft extension portion disposed to a shock absorbing means, said shock absorbing means comprising said second shaft extension member longitudinally movable within a rotatable bracket, said bracket bearing a gap between a third rotatable shaft extension portion extending from said motor, said second shaft extension member slidably movable within said gap of said rotatable collar bracket upon a flow of reverse fluid pressure against said sealing means from said outlet pipe, said movement of said second shaft extension movably limited by a blocking member disposed within a longitudinally extending groove guide within said rotatable bracket said sealing means being a spherical ball secured to a free end of said rotatable shaft.

* * * * *